United States Patent
Rifkin et al.

(10) Patent No.: US 10,136,043 B2
(45) Date of Patent: *Nov. 20, 2018

(54) SPEECH AND COMPUTER VISION-BASED CONTROL

(71) Applicant: Google Inc., Mountain View, CA (US)

(72) Inventors: Ryan M. Rifkin, Oakland, CA (US); Daniel Ramage, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,302

(22) Filed: Sep. 18, 2017

(65) Prior Publication Data

US 2018/0007250 A1    Jan. 4, 2018

Related U.S. Application Data

(63) Continuation of application No. 15/048,360, filed on Feb. 19, 2016, now Pat. No. 9,769,367.

(Continued)

(51) Int. Cl.
| | |
|---|---|
| H04N 5/232 | (2006.01) |
| G01L 15/00 | (2006.01) |
| G06F 3/00 | (2006.01) |
| G06K 9/00 | (2006.01) |
| G10L 15/26 | (2006.01) |
| G10L 15/22 | (2006.01) |

(52) U.S. Cl.
CPC ......... *H04N 5/23203* (2013.01); *G06F 3/00* (2013.01); *G06K 9/00919* (2013.01); *G10L 15/22* (2013.01); *G10L 15/26* (2013.01); *H04N 5/23219* (2013.01); *G06K 9/00355* (2013.01); *G10L 2015/223* (2013.01)

(58) Field of Classification Search
CPC ............ H04N 5/23203; H04N 5/23219; G10L 15/22; G10L 15/26; G10L 2015/223
See application file for complete search history.

(56) References Cited

U.S. PATENT DOCUMENTS

| 5,164,831 A | 11/1992 | Kuchta et al. |
| 5,227,835 A | 7/1993 | Anagnostopoulos |
| (Continued) | | |

FOREIGN PATENT DOCUMENTS

| WO | WO 2005/065283 | 7/2005 |
| WO | WO 2011/116309 | 9/2011 |
| WO | WO 2015/142719 | 9/2015 |

OTHER PUBLICATIONS

Bagnall, "Author Identification Using Multi-Headed Recurrent Neural Networks", Notebook for the PAN@CLEF Authori Identification Challenge, Jun. 16, 2015, 9 pages.

(Continued)

*Primary Examiner* — Jason A Flohre
(74) *Attorney, Agent, or Firm* — Dority & Manning, P.A.

(57) ABSTRACT

The present disclosure relates to a method for controlling a digital photography system. The method includes obtaining, by a device, image data and audio data. The method also includes identifying one or more objects in the image data and obtaining a transcription of the audio data. The method also includes controlling a future operation of the device based at least on the one or more objects identified in the image data, and the transcription of the audio data.

20 Claims, 7 Drawing Sheets

Related U.S. Application Data (60) Provisional application No. 62/202,488, filed on Aug. 7, 2015.

(56) References Cited

U.S. PATENT DOCUMENTS

| | | |
|---|---|---|
| 5,267,332 A | 11/1993 | Walch et al. |
| 5,546,145 A | 8/1996 | Bernardi et al. |
| 5,812,193 A | 9/1998 | Tomitaka et al. |
| 6,005,611 A | 12/1999 | Gullichsen et al. |
| 6,014,183 A | 1/2000 | Hoang |
| 6,301,440 B1 | 10/2001 | Bolle et al. |
| 6,448,956 B1 | 9/2002 | Berman et al. |
| 6,509,915 B2 | 1/2003 | Berman et al. |
| 6,516,154 B1 | 2/2003 | Parulski et al. |
| 6,563,532 B1 | 5/2003 | Strub et al. |
| 6,614,408 B1 | 9/2003 | Mann |
| 6,671,405 B1 | 12/2003 | Savakis et al. |
| 6,680,748 B1 | 1/2004 | Monti |
| 6,757,027 B1 | 6/2004 | Edwards et al. |
| 6,870,532 B2 | 3/2005 | Travers et al. |
| 6,930,718 B2 | 8/2005 | Parulski et al. |
| 6,940,545 B1 | 9/2005 | Ray et al. |
| 7,006,881 B1 | 2/2006 | Hoffberg et al. |
| 7,031,555 B2 | 4/2006 | Troyanker |
| 7,076,102 B2 | 7/2006 | Lin et al. |
| 7,233,684 B2 | 6/2007 | Fedorovskaya et al. |
| 7,352,918 B2 | 4/2008 | Tannhof et al. |
| 7,430,369 B2 | 9/2008 | Fukui |
| 7,511,838 B2 | 3/2009 | Hunter |
| 7,532,234 B2 | 5/2009 | Sadovsky et al. |
| 7,551,754 B2 | 6/2009 | Steinberg et al. |
| 7,616,233 B2 | 11/2009 | Steinberg et al. |
| 7,616,248 B2 | 11/2009 | Parulski et al. |
| 7,676,145 B2 | 3/2010 | Kuberka et al. |
| 7,714,898 B2 | 5/2010 | Pilu |
| 7,729,532 B2 | 6/2010 | Tedesco et al. |
| 7,729,602 B2 | 6/2010 | Janson, Jr. et al. |
| 7,742,625 B2 | 6/2010 | Pilu |
| 7,751,683 B1 | 7/2010 | Belknap |
| 7,761,812 B2 | 7/2010 | Ostojic et al. |
| 7,792,335 B2 | 9/2010 | Steinberg et al. |
| 7,804,983 B2 | 9/2010 | Steinberg et al. |
| 7,809,162 B2 | 10/2010 | Steinberg et al. |
| 7,817,914 B2 | 10/2010 | Kuberka et al. |
| 7,826,092 B2 | 11/2010 | Ejima et al. |
| 7,924,323 B2 | 4/2011 | Walker et al. |
| 7,953,690 B2 | 5/2011 | Luo et al. |
| 8,005,268 B2 | 8/2011 | Steinberg et al. |
| 8,041,076 B1 | 10/2011 | Bourdev |
| 8,072,495 B2 | 12/2011 | Pai et al. |
| 8,132,096 B1 | 3/2012 | Widdowson et al. |
| 8,180,106 B2 | 5/2012 | Matsugu et al. |
| 8,180,112 B2 | 5/2012 | Kurtz et al. |
| 8,200,019 B2 | 6/2012 | Zhang et al. |
| 8,200,025 B2 | 6/2012 | Woodbeck |
| 8,208,697 B2 | 6/2012 | Schaffer et al. |
| 8,224,122 B2 | 7/2012 | Cohen et al. |
| 8,238,695 B1 | 8/2012 | Davey et al. |
| 8,265,348 B2 | 9/2012 | Steinberg et al. |
| 8,311,364 B2 | 11/2012 | Cerosaletti et al. |
| 8,427,538 B2 | 4/2013 | Ahiska |
| 8,442,268 B2 | 5/2013 | Isogai et al. |
| 8,466,987 B2 | 6/2013 | Walker et al. |
| 8,475,396 B2 | 7/2013 | Jones et al. |
| 8,478,053 B2 | 7/2013 | Ishiga |
| 8,514,315 B2 | 8/2013 | Lee et al. |
| 8,520,116 B2 | 8/2013 | Kang |
| 8,666,225 B2 | 3/2014 | Ogura et al. |
| 8,677,257 B2 | 3/2014 | Doepke et al. |
| 8,677,283 B2 | 3/2014 | Fong |
| 8,700,392 B1 * | 4/2014 | Hart ............... G10L 15/25 704/231 |
| 8,708,903 B2 | 4/2014 | Tran |
| 8,723,951 B2 | 5/2014 | Ahiska et al. |
| 8,775,971 B2 | 7/2014 | Hoover |
| 8,886,298 B2 | 11/2014 | Williams et al. |
| 8,897,485 B2 | 11/2014 | Fedorovskaya et al. |
| 8,902,198 B1 | 12/2014 | Karakotsios et al. |
| 8,924,886 B2 | 12/2014 | Matsue et al. |
| 8,938,124 B2 | 1/2015 | Eilat et al. |
| 9,024,842 B1 | 5/2015 | Prada Gomez et al. |
| 9,030,446 B2 | 5/2015 | Mistry et al. |
| 9,060,127 B2 | 6/2015 | Wexler et al. |
| 9,086,756 B2 | 7/2015 | Schön et al. |
| 9,288,375 B2 | 3/2016 | Walker et al. |
| 9,288,376 B2 | 3/2016 | Walker et al. |
| 9,418,375 B1 | 8/2016 | Cunico et al. |
| 2001/0020837 A1 | 9/2001 | Yamashita et al. |
| 2003/0058340 A1 | 3/2003 | Lin et al. |
| 2003/0146938 A1 | 8/2003 | Geiger |
| 2004/0005915 A1 | 1/2004 | Hunter |
| 2004/0012508 A1 | 1/2004 | Wolfson et al. |
| 2004/0075743 A1 | 4/2004 | Chatani et al. |
| 2004/0080618 A1 | 4/2004 | Norris et al. |
| 2004/0114176 A1 | 6/2004 | Bodin et al. |
| 2004/0125088 A1 | 7/2004 | Zimmerman et al. |
| 2004/0162647 A1 | 8/2004 | Koshizen et al. |
| 2004/0212637 A1 | 10/2004 | Varghese |
| 2005/0030387 A1 | 2/2005 | Pilu |
| 2005/0192808 A1 | 9/2005 | Sugiyama |
| 2005/0200486 A1 | 9/2005 | Greer |
| 2005/0231589 A1 | 10/2005 | Chiang |
| 2006/0115185 A1 | 6/2006 | Iida et al. |
| 2006/0187305 A1 | 8/2006 | Trivedi et al. |
| 2006/0268121 A1 | 11/2006 | Watanabe |
| 2007/0124783 A1 | 5/2007 | Ahiska et al. |
| 2007/0201694 A1 | 8/2007 | Bolle et al. |
| 2008/0144968 A1 | 6/2008 | Cohen et al. |
| 2008/0192129 A1 * | 8/2008 | Walker ............... H04N 5/23222 348/231.2 |
| 2008/0229235 A1 | 9/2008 | Vau et al. |
| 2009/0141969 A1 | 6/2009 | Yu et al. |
| 2009/0219411 A1 | 9/2009 | Marman et al. |
| 2009/0324010 A1 | 12/2009 | Hou |
| 2009/0324098 A1 | 12/2009 | Nilsson |
| 2010/0031186 A1 | 2/2010 | Tseng et al. |
| 2010/0058240 A1 | 3/2010 | Bull et al. |
| 2010/0199232 A1 | 8/2010 | Mistry et al. |
| 2010/0231730 A1 * | 9/2010 | Ichikawa ............ H04N 5/23219 348/207.99 |
| 2011/0043631 A1 | 2/2011 | Marman et al. |
| 2011/0128414 A1 | 6/2011 | Walker et al. |
| 2011/0159921 A1 | 6/2011 | Davis et al. |
| 2011/0211040 A1 | 9/2011 | Lindemann et al. |
| 2012/0054670 A1 | 3/2012 | Rainisto |
| 2012/0106848 A1 | 5/2012 | Greig et al. |
| 2012/0147220 A1 | 6/2012 | Lee |
| 2012/0174005 A1 | 7/2012 | Deutsch et al. |
| 2012/0231730 A1 | 9/2012 | Ishikawa |
| 2012/0242844 A1 | 9/2012 | Walker et al. |
| 2012/0257071 A1 | 10/2012 | Prentice |
| 2012/0294514 A1 | 11/2012 | Saunders et al. |
| 2013/0077820 A1 | 3/2013 | Marais et al. |
| 2013/0088520 A1 | 4/2013 | Mak |
| 2013/0104080 A1 | 4/2013 | Bosworth et al. |
| 2013/0169536 A1 | 7/2013 | Wexler et al. |
| 2013/0169682 A1 | 7/2013 | Novak et al. |
| 2013/0201344 A1 | 8/2013 | Sweet, III et al. |
| 2013/0201359 A1 | 8/2013 | Wu et al. |
| 2013/0245396 A1 | 9/2013 | Berman et al. |
| 2013/0314566 A1 | 11/2013 | Walker et al. |
| 2014/0002580 A1 | 1/2014 | Bear et al. |
| 2014/0002588 A1 | 1/2014 | Ahiska |
| 2014/0021828 A1 | 1/2014 | Despesse |
| 2014/0022196 A1 | 1/2014 | Henry et al. |
| 2014/0043517 A1 | 2/2014 | Yim et al. |
| 2014/0104424 A1 | 4/2014 | Zhang et al. |
| 2014/0160316 A1 * | 6/2014 | Hwang ............... H04N 5/23293 348/231.99 |
| 2014/0184849 A1 | 7/2014 | Kim |
| 2014/0218283 A1 | 8/2014 | Choi et al. |
| 2014/0241616 A1 | 8/2014 | Medvedovsky et al. |
| 2014/0242560 A1 | 8/2014 | Movellan et al. |

(56) References Cited

U.S. PATENT DOCUMENTS

| | | |
|---|---|---|
| 2014/0253791 A1 | 9/2014 | Koskinen et al. |
| 2014/0270707 A1 | 9/2014 | Fathi et al. |
| 2014/0375761 A1 | 12/2014 | Ahiska et al. |
| 2015/0029349 A1 | 1/2015 | Ben Israel et al. |
| 2015/0058944 A1 | 2/2015 | Schachtel et al. |
| 2015/0074532 A1* | 3/2015 | Lapidot .................. H04N 7/181 715/719 |
| 2015/0086109 A1 | 3/2015 | Paris et al. |
| 2015/0117760 A1 | 4/2015 | Wang et al. |
| 2015/0146026 A1 | 5/2015 | Walker et al. |
| 2015/0350504 A1 | 12/2015 | Corcoran |
| 2016/0173782 A1 | 6/2016 | Dimson et al. |
| 2016/0203386 A1 | 7/2016 | Porecki et al. |
| 2016/0321427 A1 | 11/2016 | Bogoni et al. |
| 2016/0321784 A1 | 11/2016 | Annapureddy |
| 2016/0328643 A1 | 11/2016 | Liu et al. |

OTHER PUBLICATIONS

Berry et al., "The Use of a Wearable Camera, SenseCam, as a Pictorial Diary to Improve Autobiographical Memory in a Patient with Limbic Encephalitis: A Preliminary Report", Neuropsychological Rehabilitation, vol. 17, Issue 4/5, Aug.-Oct. 2007, pp. 582-601.
Blighe et al., "Identifying Different Settings in a Visual Diary", Ninth International Workshop on Image Analysis for Multimedia Interactive Services, Klagenfurt, Austria, May 7-9, 2008, pp. 24-27.
Byrne et al., "Everyday Concept Deteetion in Visual Lifelogs: Validation, Relationships and Trends", Multimedia Tools and Applications, vol. 49, No. 1, Aug. 2010, pp. 119-144.
Charara, "How Machine Learning Will Take Wearable Data to the Next Level", wareable.com/wearable-tech/machine-learning-wearable-data-sensors-2015, retrieved on Sep. 17, 2015,6 pages.
Davis et al., "From Context to Content: Leveraging Context to Infer Media Metadata", Proceedings of the ACM International Conference on Multimedia, New York, New York, Oct. 10-16, 2004, pp. 188-195.
Doherty et al., "Automatically Augmenting Lifelog Events Using Pervasively Generated Content from Millions of People", Sensors, vol. 10, Issue 3, Feb. 26, 2010, pp. 1423-1446.
Doherty et al., "Combining Image Descriptors to Effectively Retrieve Events from Visual Lifelogs", ACM International Conference on Multimedia Information Retrieval, Vancouver, Canada, Oct. 30-31, 2008, pp. 10-17.
Harris, "Why Machine Learning Might be a Wearable Camera's Best Friend", gigaom.com/2013/09/13/why-machine-learning-might-be-a-wearable-cameras-best-friend!. retrieved on Sep. 17, 2015—4 pages.
Higginbotham, "How Facebook is Teaching Computers to See", fortune.com/2015/06/15/facebook-ai-moments/, retrieved on Sep. 17, 2015,5 pages.
Hodges et al., "SenseCam: A Wearable Camera Which Stimulates and Rehabilitates Autobiographical Memory", Memory, vol. 19, Issue 7, Oct. 2011, pp. 685-696.
International Search Report & Written Opinion for PCT/US2016/045681 dated Sep. 26, 2016—11 pages.
Jones et al., "Automated Annotation of Landmark Images Using Community Contributed Datasets and Web Resources", International Conference on Semantic and Digital Media Technologies, Saarbmcken, Germany, Dec. 1-3, 2010, 16 pages.
Lomas, "Neurence's Cloud Platform Gives Wearables Eyes that Can See and Ears that Can Hear", http://techcmnch.com/2014/12/18/neurence-sense-launch/, retrieved on Sep. 17, 2015, 12 pages.
Lu et al., "Story-Driven Summarization for Egocentric Video", Proceedings of the IEEE Conference on ComputerVisionandPatternRecognition, Portland, Oregon, Jun. 23-28, 2013, pp. 2714-2721.
Mnih et al., "Recurrent Models of Visual Attention", Advances in Neural Information Processing Systems, Montreal, Canada, Dec. 8-13, 2014, pp. 2201-2212.
Movidius: Myraid 2 Vision Processor Product Brief, 2014, movidius.com/solutions/vision-processing-unit, retrieved on Sep. 17, 2015,2 pages.
Stamer et al., "The Gesture Pendant: A Self-Illuminating, Wearable, Infrared Computer Vision System for Home Automation Control and Medical Monitoring", Proceedings of the 4th IEEE International Symposium on Wearable Computers, Atlanta, Georgia, Oct. 16-17, 2000, 8 pages.
Tang et al., "Learning Generative Models with Visual Attention", Advances in Neural Information Processing Systems, Montreal, Canada. Dec. 8-13, 2014, pp. 1808-1816.
Van Laerhoven et al., "Real-Time Analysis of Data from Many Sensors with Neural Networks", Proceedings of the 5th IEEE International Symposium on Wearable Computers, Zurich, Switzerland, Oct. 8-9, 2001, 8 pages.
Wingfield, "A New Action Camera, Born From a Cycling Crash", bits.blogs.nytimes.com/2015/08/05/a-new-action-camera-born-from-a-cycling-crash!? r=O, retrieved on Oct. 6, 2015, 2 pages.

* cited by examiner

SPEECH AND COMPUTER VISION-BASED CONTROL

CROSS-REFERENCE TO RELATED APPLICATION

The present application is a continuation of U.S. application Ser. No. 15/048,360 titled "Speech and Computer Vision-Based Control" and having a filing date of Feb. 19, 2016, which claims the benefit of U.S. Provisional Application No. 62/202,488, filed Aug. 7, 2015. This present application claims priority to and benefit of application Ser. No. 15/048,360 and 62/202,488 and incorporates all such applications herein by reference in their entirety.

TECHNICAL FIELD

This specification generally relates to speech recognition and computer vision.

BACKGROUND

Digital cameras, which are devices for recording images such as still photographs or videos, are used in photography. Because photographers often take pictures of other people, photography is seldom a purely solo phenomenon. Rather, such as in the instances where a photographer takes pictures at a party, or where a shared camera is left on a table at a party for many people to use, photography is often used to enhance a larger social experience.

SUMMARY

According to one implementation, this specification describes a process for controlling an operation of a digital camera device based at least on speech commands that are uttered by a photographer and/or by human subjects of a photo, as well as one or more features, e.g., gestures, faces, or objects, in a digital camera image. For example, a user can speak a command to instruct a camera to automatically take or share, e.g., by uploading to a social network or picture storage site, pictures in future circumstances when a certain visual feature is present within the field of view of the camera, and the camera will then take a picture whenever that feature is identified. As another example, a voice command can instruct a camera to not take or share a picture when a certain visual feature is present within the field of view of the camera. In this manner, a set of rules for automatically taking pictures can be generated by one or more users, and the digital camera may automatically take pictures based on the set of rules without further contemporaneous or direct commands from the one or more users.

The present disclosure relates to a method of obtaining, by a device, (i) image data and (ii) audio data; identifying one or more objects in the image data; obtaining a transcription of the audio data; and controlling a future operation of the device based at least on (i) the one or more objects identified in the image data, and (ii) the transcription of the audio data.

The present disclosure also relates to a system comprising one or more computers and one or more storage devices storing instructions that are operable, when executed by the one or more computers, to cause the one or more computers to perform operations comprising: obtaining, by a device, (i) image data and (ii) audio data; identifying one or more objects in the image data; obtaining a transcription of the audio data; and controlling a future operation of the device based at least on (i) the one or more objects identified in the image data, and (ii) the transcription of the audio data.

In addition, the present disclosure relates to a computer-readable medium storing software comprising instructions executable by one or more computers which, upon such execution, cause the one or more computers to perform operations comprising: obtaining, by a device, (i) image data and (ii) audio data; identifying one or more objects in the image data; obtaining a transcription of the audio data; and controlling a future operation of the device based at least on (i) the one or more objects identified in the image data, and (ii) the transcription of the audio data.

Implementations may include one or more of the following features. Controlling a future operation of the device may comprise determining whether to capture future image data, or determining whether to automatically upload future generated image data to cloud storage. Identifying one or more objects in the image data may comprise at least one of identifying a person using face detection, identifying a gesture performed by a person in the image, or detecting an action performed by a person in the image. The image data and the audio data may be generated by the device. A set of one or more rules may be generated, where the controlling of a future operation of the device is based on the set of one or more rules. The transcription of the audio data may be obtained using automated speech recognition. The one or more objects in the image data may be identified using computer vision.

Advantageous implementations may include one or more of the following features. The combination of computer vision and speech recognition may enable collaborative photography techniques. Speech recognition may provide a separate control and information stream that can synergistically augment computer vision. The system and techniques described may allow individuals other than the device user to control the device as they desire. The system and techniques also may allow individuals to tailor captured images to their personal preferences. The number of unwanted captured images may be reduced, reducing storage requirements and increasing network bandwidth, as the system is controlled to only take or share captured images that satisfy spoken criteria. As the device automatically captures desired images based on a set of rules, the user may not need to spend as much time manually controlling the device to capture images.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Traditional cameras have been operated solely based on the manual inputs of photographers that are holding or otherwise controlling the camera. As such, photographers must typically be trained to operate a camera, and must also remain cognizant of the picture taking environment, so as to take pictures of the desired subjects or situations. Certain video cameras may record only when movement is detected by a motion sensor. However, as photography has become less specialized and more social, people who are typically the subjects of a picture have shown additional interest in taking or sharing pictures of themselves or others, or of certain situations, without instructing a photographer and without receiving specialized photography training.

Accordingly, the present disclosure describes techniques for using speech recognition and computer vision to instruct a future operation of a camera. The camera may receive speech commands from a user or other person, and the camera may automatically capture an image if a feature in the image corresponds to the speech command. Speech recognition allows people other than camera's owner to control picture taking by issuing voice commands. Computer vision allows the camera to identify who is in the frame and who is speaking. In some cases, speech recognition may provide an entirely separate control and information stream that synergistically augments computer vision. By combining speech recognition and computer vision, the disclosed techniques can allow picture taking to be much more of a shared, collaborative experience.

FIGS. 1A-1D show diagrams of examples of a digital photography system 100. The digital photography system 100 includes an example digital camera 102 that is generating an image of one or more subjects 104. The camera 102 includes a display 108 that may show an image of the subjects 104 as well as additional information. One or more of the subjects 104 issues an audio command 106 that is received by the camera 102. The camera 102 interprets the audio command 106 and visual information associated with the subjects 104 to determine whether and when to capture an image of the subjects 104. The interpretation 110 shows example audio cues and visual cues that may be used to determine one or more rules for capturing images.

The digital camera 102 may be any suitable device through which an image can be obtained. For example, the digital camera 102 may include a standalone camera or a camera implemented in a smartphone, tablet computer, portable computer, desktop computer, or other device. The display 108 may be an LCD screen, touchscreen, or other type of display that may show images and/or information. In some implementations, the digital camera 102 does not include a display 108, or is coupled to a display 108 that is separate from the digital camera 102. In some implementations, the digital camera 102 is worn by a single user, for example around the neck or clipped to the shirt pocket. The digital camera 102 may include one or more microphones. In some implementations, the digital camera 102 may be continuously obtaining images and/or running computer vision.

Figure 1A:
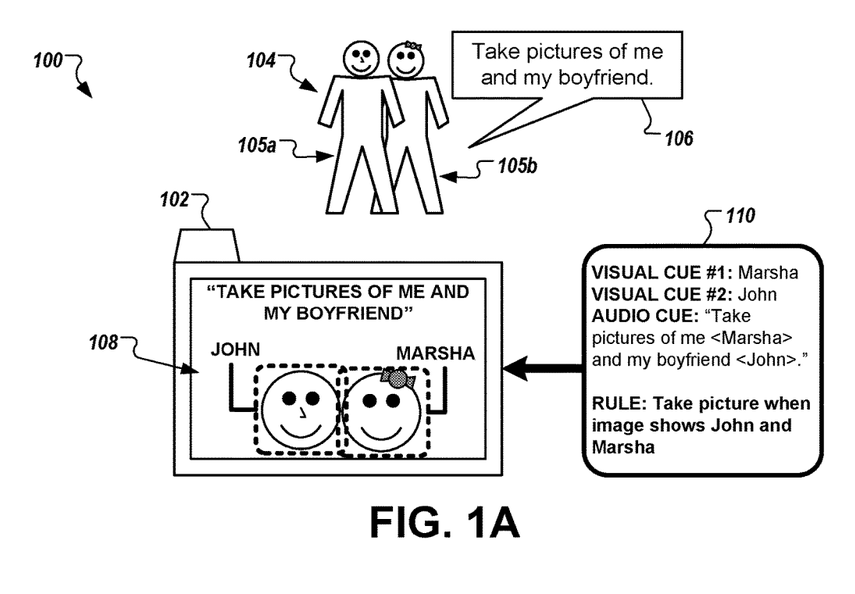
FIGS. 1A-1F are diagrams of example digital photography systems.

FIG. 1A shows an example of digital photography system 100. In FIG. 1A, the subject 104 include two persons, a man 105a and a woman 105b. The woman 105b has uttered the speech command 106, "Take pictures of me and my boyfriend." As shown on the camera display 108, the camera 102 has identified the speech utterance 106 as well as the man 105a as "John" and the woman 10b as "Marsha."

Example interpretation 110 shows how the camera 102 may interpret the speech command 106 and visual information, such as that shown on display 108. The camera 102 may be able to identify "John" as the boyfriend of "Marsha" using face detection, metadata, contact information, social media, or other techniques. In some cases, the camera 102 may categorize these subjects as visual cues. The camera 102 may also interpret the speech command 106, "Take pictures of me and my boyfriend." For example, the camera 102 may identify "me" as the woman 150b and "my boyfriend" as the man 105a. The camera 102 may use speech recognition techniques to transcribe the speech command 106.

As example interpretation 110 shows, the camera 102 may interpret the speech command 106 and visual information into a new rule "Take picture when image shows John and Marsha." In this manner, the camera 102 may be directed to automatically capture images whenever both John and Marsha are identified in the same image, e.g., when both John and Marsha are within the field of view of the camera.

Figure 1B:
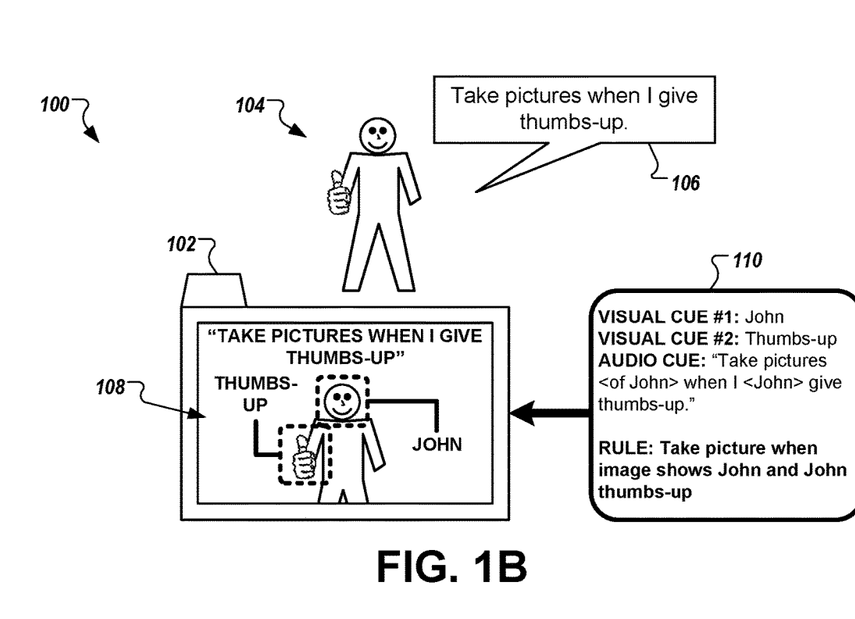

FIG. 1B shows a second example of digital photography system 100. In FIG. 1B, the subject 104 is a single person, and the speech command 106 is "Take pictures when I give thumbs-up." In this example, the camera 102 may identify the subject 104 as "John," and also identify that the subject 104 is giving a "thumbs-up" sign. The example interpretation 110 shows that the camera 102 has identified the speaker as John as and that John is giving a thumbs-up sign.

Based on these visual and audio inputs, the camera 102 has generated the rule "Take picture when image shows John and John thumbs-up." In this manner, the camera 102 may be directed to automatically capture images that show John whenever John is giving a thumbs-up. While the example shown in FIG. 1B uses a thumbs-up as a visual cue, in other implementations, other visual signifiers may be identified, such as other types of body language, gestures, facial features such as smiling, blinking, etc., laughter, crying, or other sounds, activities such as walking, jumping, etc., or other visual signifiers.

Figure 1C:
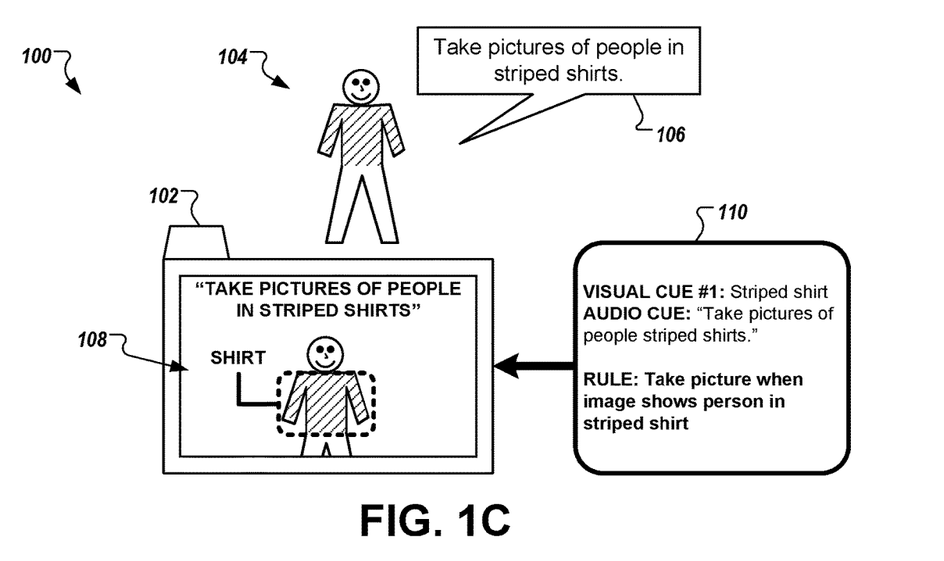

FIG. 1C shows a third example of digital photography system 100. In FIG. 1C, the subject 104 is a single person, and the speech command 106 is "Take pictures of people in striped shirts." In this example, the camera 102 may identify that the subject 104 is wearing a striped shirt. The example interpretation 110 shows that the camera 102 has identified the subject 104 as wearing a striped shirt.

Based on these inputs, the camera 102 has generated the rule "Take picture when image shows person in striped shirt." In this manner, the camera 102 may be directed to automatically capture images that show a person wearing a striped shirt. In some cases, the camera 102 may take a picture of a person wearing a striped shirt that is not the same person as subject 104. In this manner, the camera may take pictures of persons with specific features, such as wearing a certain color of hat, a certain logo on clothing, certain color hair, or other features.

Figure 1D:
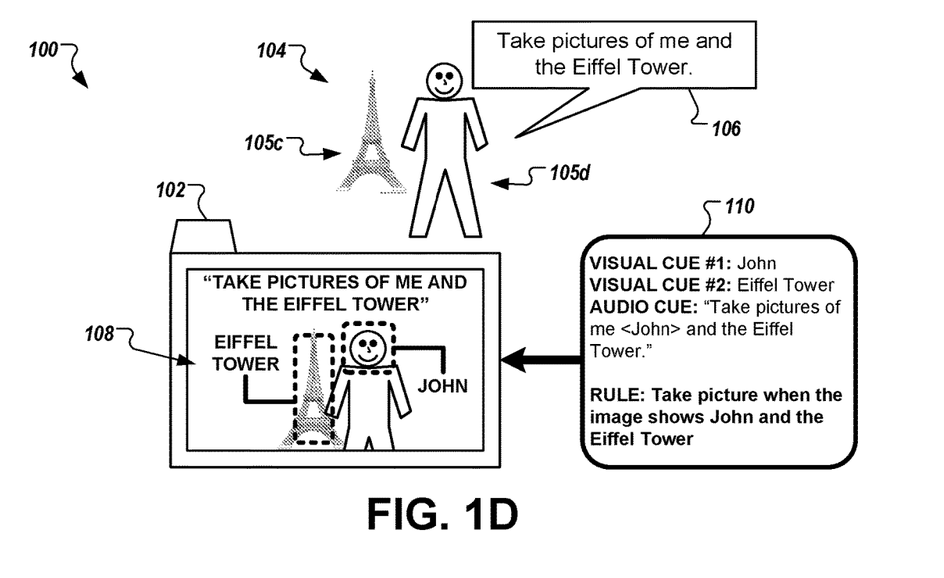

FIG. 1D shows a fourth example of digital photography system 100. In FIG. 1D, the subject 104 is a landmark 105c and single person 105d, and the speech command 106 is "Take pictures of me and the Eiffel Tower." In this example, the camera 102 may identify that the speaker is the person 105d and that the landmark 105c is the Eiffel Tower. The example interpretation 110 shows that the camera 102 has identified the person 105d as "John" and the landmark 105c is the Eiffel Tower.

Based on these inputs, the camera 102 has generated the rule "Take picture when the image shows John and the Eiffel Tower." In this manner, the camera 102 may be directed to automatically capture images that show John and the Eiffel Tower. In some cases, the camera 102 may be directed to take a picture of a person who is not the speaker. In this manner, the camera 102 may identify and take pictures of non-person subjects such as buildings, landmarks, pets or other animals, objects, natural features, or other non-person subjects.

Figure 1E:
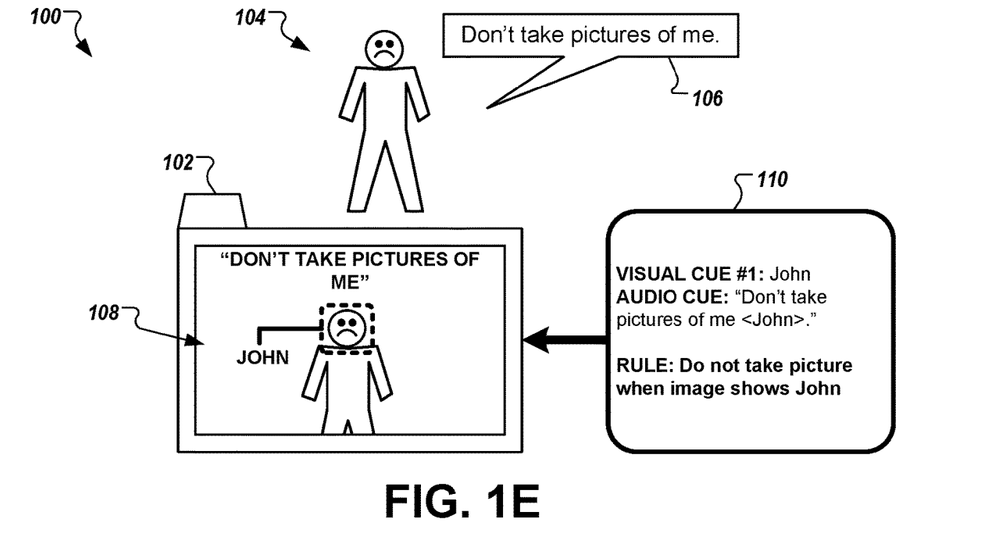

FIG. 1E shows a fifth example of digital photography system 100. In FIG. 1E, the subject 104 is a single person, and the speech command 106 is "Don't take pictures of me." In this example, the camera 102 may identify that the subject 104 is "John." The camera 102 has generated the rule "Do not take picture when image shows John." In this manner, the camera 102 may be directed to not capture images that show John. In this manner, the camera 102 may be directed to not capture images that show certain people, objects, locations, or other features. For example, the speech command may be "Do not take a picture of my daughter," "Do not take a picture of my car," or another command.

Figure 1F:
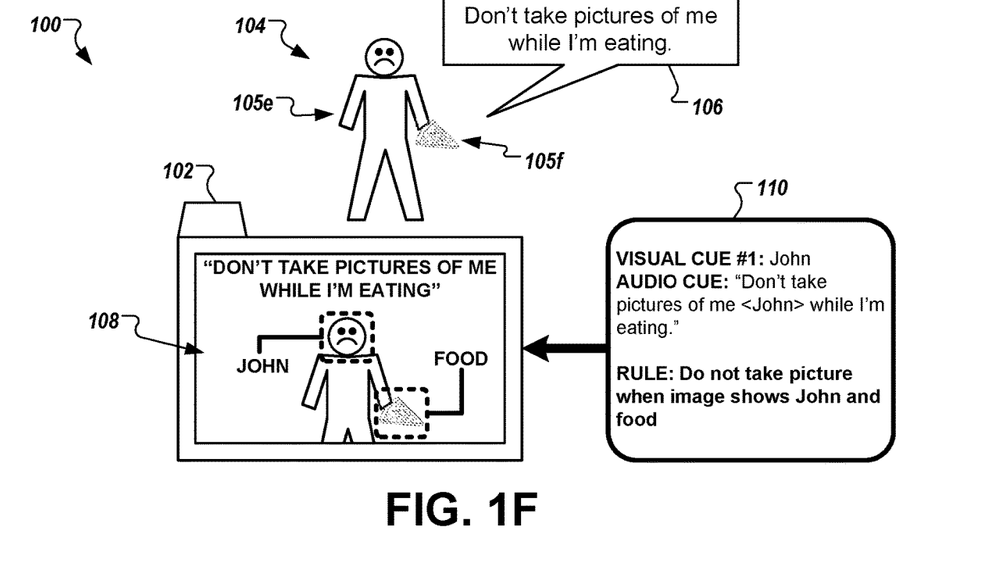

FIG. 1F shows a sixth example of digital photography system 100. In FIG. 1F, the subject 104 is single person 105e holding food 105f, and the speech command 106 is "Don't take pictures of me while I'm eating." In this example, the camera 102 may identify that the speaker is the person 105e and that the person is holding food 105f. The example interpretation 110 shows that the camera 102 has identified the person 105e as "John" and identified the food 105f.

In light of these inputs, the camera 102 has generated the rule "Do not take picture when image shows John and good." In this manner, the camera 102 may be directed to not capture images that show both John and food. In some cases, the camera 102 may be directed to take a picture of a person who is not the speaker. In this manner, picture-taking rules may be generated based on persons or objects identified in an image.

Alternatively, the speech command 106 may be an instantaneous command to take a picture. The camera 102 may interpret such a speech command 106 and determine to capture an image in response. For example, a person in view of the camera may say "cheese!" or "snap a picture!" or "shoot this!" as the speech command 106. The camera 102 may identify that a person is in view of the camera 102 and may be directed to capture an image in response to the speech command 106.

Figure 2:
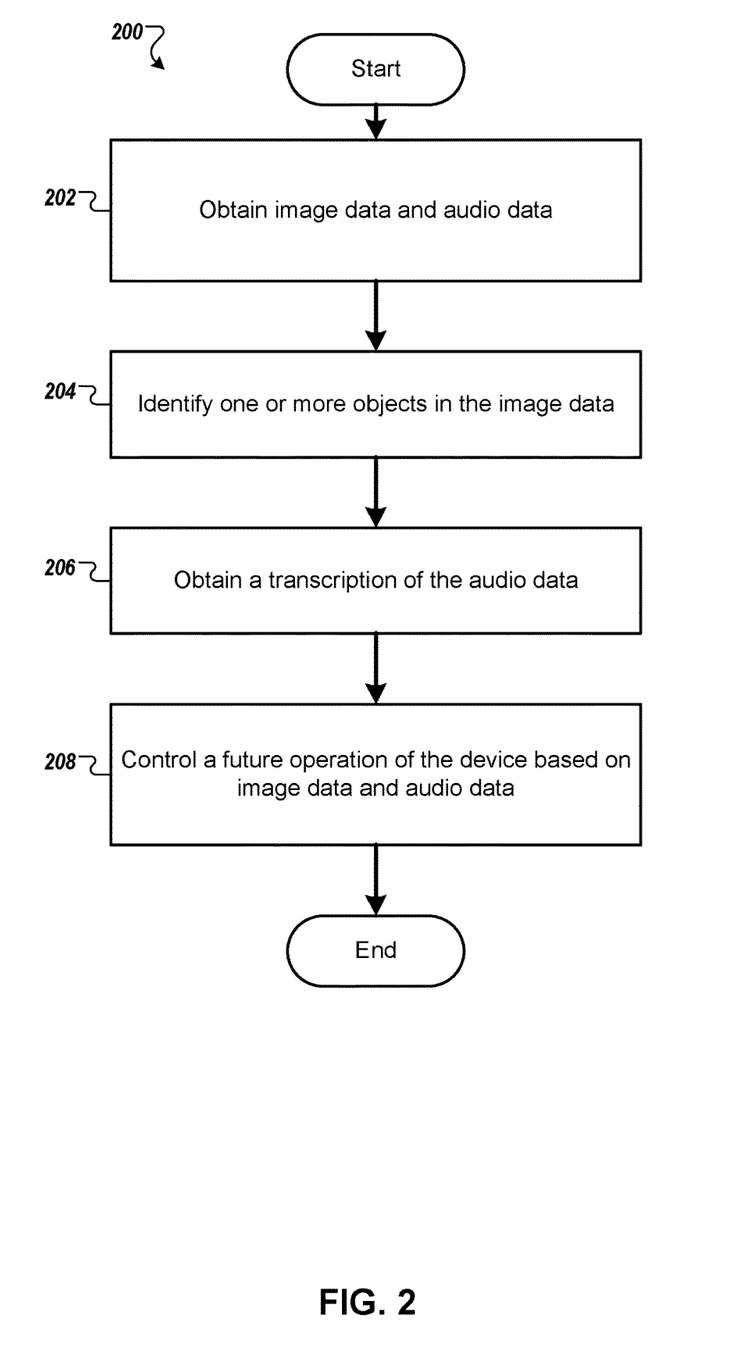
FIG. 2 is a flow chart illustrating an example process for controlling a digital photography system.

FIG. 2 is a flow chart illustrating an example process 200 for controlling a digital photography system. The example process 200 may be implemented, for example, by some or all of system 100. At 202, a device obtains image data and audio data. For example, the audio data may include a data file of a waveform, an audio file, or other data type that encodes an utterance. The image data may include a data file of an image, a data file of a video, or other data that encodes an image or video. The device may be a digital camera, a portable computer, smartphone, or other device as described previously. In some implementations, the device generates the audio data and the video data.

At 204, one or more objects in the image data are identified. The objects can be people, structures, animals, gestures, or other features as described previously. In some cases, an object is identified using computer vision. At 206, a transcription of the audio data is obtained. The transcription may be obtained, for example, using a speech recognizer. A speech recognizer may use one or more speech recognizer components in generating transcriptions of audio data such as an acoustic model, a language model, or another type of speech recognizer component At 208, a future operation of the device is controlled based on at least an object identified in the image data and the transcription of the audio data. Controlling a future operation of the device may include determining whether to capture future image data. For example, image data obtained in the future may be captured if the image data includes an image of a particular object.

In other examples, controlling a future operation of the device may include determining whether to automatically upload future generated image data to cloud storage. For example, whether to store the data locally or whether to store the data in cloud storage can be determined based on instructions within the audio data and one or more objects identified in the image data. In some cases, controlling a future operation of the device may include controlling parameters or features of the device. For instance, the flash, the focus, the aperture, or other parameters may be controlled. As an illustrative example, the device could obtain a transcription of "Use the flash when taking a picture of me," indicating that the camera should turn the flash on when the speaker is identified in an image. Controlling the future operation of the device can also be based on a set of one or more rules.

Figure 3:
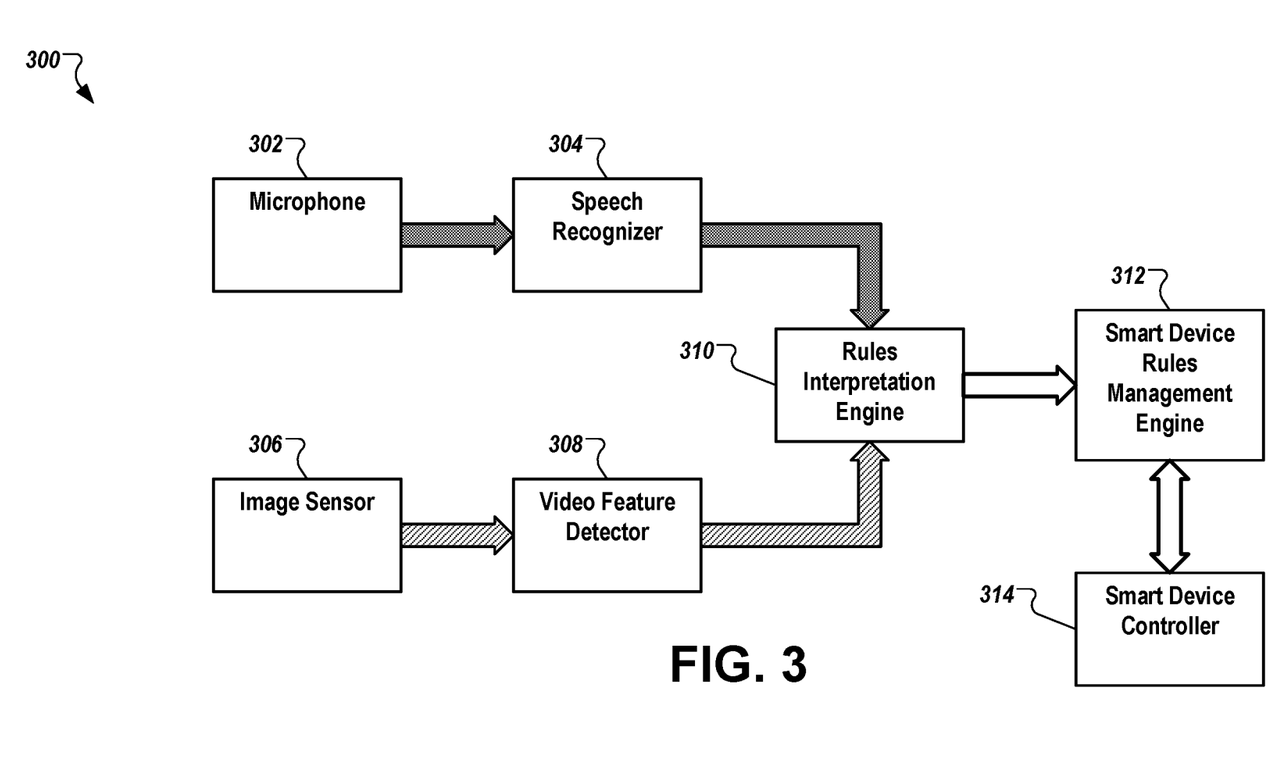
FIG. 3 is a diagram of an example digital photography system.

FIG. 3 is a diagram of an example digital photography system 300. The system 300 may be implemented by, for example, the system 100 shown in FIG. 1 or the process shown in FIG. 2. The system 300 may also be included as part of a device such as a camera, portable computer, smartphone, or other device as described previously. The system 300 includes a microphone 302. The microphone 302 receives audio energy, e.g. speech or other noise, and transmits the audio energy as a signal to a speech recognizer 304. The microphone 302 may transmit the audio energy as a signal, data, a data file, or in another form.

The speech recognizer 304 receives the audio signal from the microphone 302 and generates a transcript of speech present in the audio signal. In some cases, the speech recognizer 304 communicates with a speech recognition server to generate a transcription. The speech recognition server is not shown in FIG. 3. The speech recognition server can receive speech recognition requests from a device, and, using one or more speech models, provide speech transcriptions back to the device.

The system 300 also includes an image sensor 306. The image sensor 306 may be a digital camera sensor, CCD camera sensor, or other type of image sensor. The image sensor 306 obtains image data and transmits the image data to a video feature detector 308. The video feature detector 308 may identify features within the image data received from the image sensor 306. For example, the video feature detector may detect and/or identify faces within the image data.

Both the speech recognizer 304 and the video feature detector 308 transmit data to the rules interpretation engine 310. For instance, the speech recognizer 304 may transmit a transcript and/or transcript metadata to the rules interpretation engine 310, and the video feature detector 308 may transmit information associated with detected features to the rules interpretation engine 310. The rules interpretation engine 310 receives the data from the speech recognizer 304 and video feature detector 308 and uses the data to generate a set of one or more rules controlling future device operation.

The set of rules may be transmitted to a smart device rules management engine 312 that stores and manages sets of rules. For example, the rules management engine 312 may organize sets of rules, classify sets of rules, check sets of rules for inconsistencies, or other management operations. The rules management engine 312 interfaces with the smart device controller 314 to implement the rules controlling the device. For example, the smart device controller 314 may interact with the rules management engine 312 to determine that one or more of the rules is satisfied, and to control the device accordingly.

Figure 4:
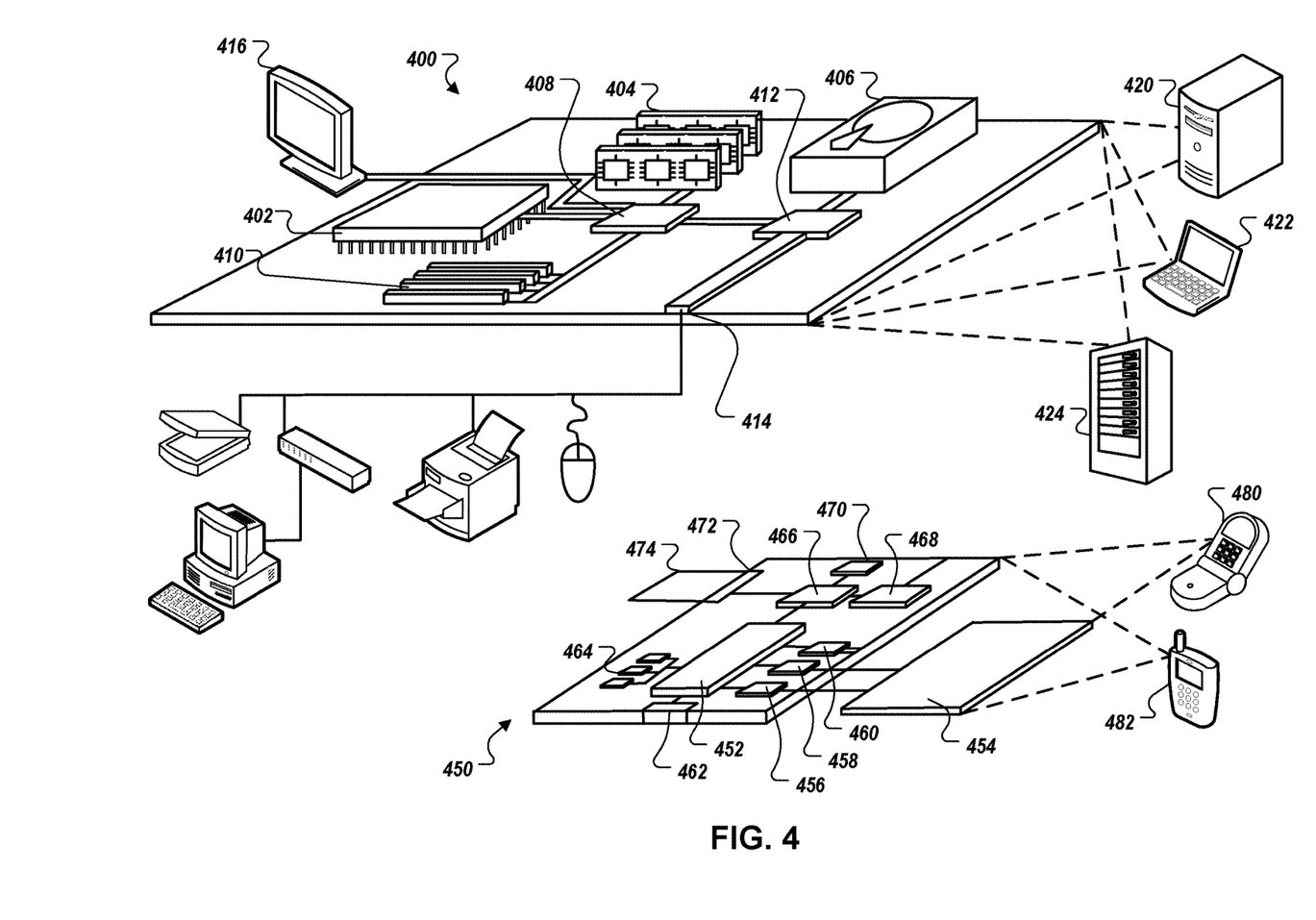
FIG. 4 shows an example of a computing device and an example of a mobile computing device that can be used to implement the techniques described here.
Figure 5:
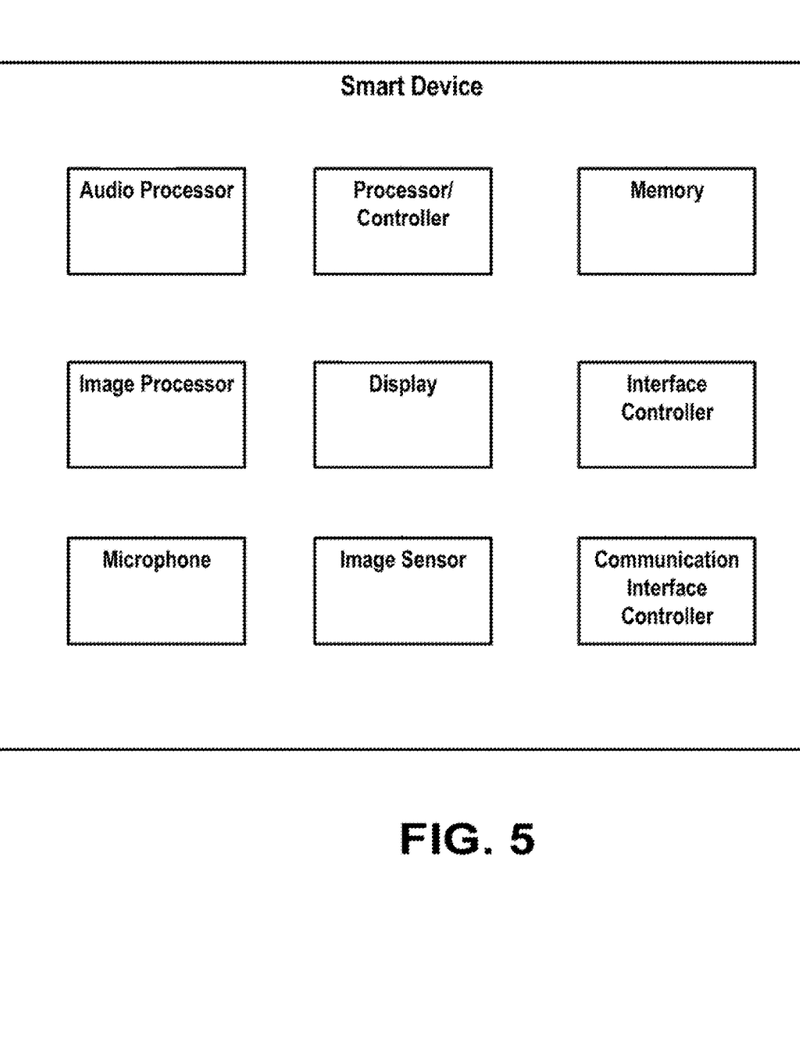
FIG. 5 shows a block diagram of an example smart device.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, digital cameras, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations, e.g., as a server bank, a group of blade servers, or a multi-processor system.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416, e.g., through a graphics processor or accelerator, and to the high-speed expansion ports 410, which may accept various expansion cards, not shown. In the implementation, the low-speed interface 412 is coupled to the storage device 406 and the low-speed expansion port 414. The low-speed expansion port 414, which may include various communication ports, e.g., USB, Bluetooth, Ethernet, wireless Ethernet or others, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, not shown, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive audio information and convert it to usable digital information. The audio codec 460 may likewise generate audible sound for a user, such as through a speaker, e.g., in a handset of the mobile computing device 450. Such sound may include sound from voice telephone calls, may include recorded sound, e.g., voice messages, music files or others, and may also include sound generated by applications operating on the mobile computing device 450.

The mobile computing device 450 may also include an imaging system (not shown), which may receive images and convert the images to usable digital information. The image system may include an image sensor such as a CCD camera or other digital image sensor. In some implementations, the imaging system receives images continuously. The imaging system may capture image data, store image data, upload image data to cloud storage, or otherwise maintain image data. The imaging system may include one or more video codecs to generate image data. The image data may include still images and/or video. The imagine system may interface with display 454 on the mobile computing device 450 to show image data on the display 454.

The mobile computing device 450 may be implemented in a number of different forms, as shown in the figure. For example, it may be implemented as a cellular telephone 480. It may also be implemented as part of a smart-phone 482, digital camera, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor for displaying information to the user, and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback, and input from the user may be received in any form, including acoustic, speech, or tactile input.

The systems and techniques described here may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the systems and techniques described here, or any combination of such back end, middleware, or front end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    obtaining, by a computing device operable to capture images, (i) image data that describes a first scene that includes one or more objects and (ii) audio data that describes a human speech utterance, wherein the human speech utterance refers to at least a first object of the one or more objects included in the first scene;
    identifying, by the computing device based at least in part on the audio data and based at least in part on the image data, at least the first object that is included in the first scene and that is referred to by the human speech utterance;
    defining, by the computing device, a new rule that specifies a behavior of the computing device in response to future instances of identification of the first object in future image data that is different than the current image data; and
    controlling, by the computing device, a future operation of the computing device to comply with the new rule.

2. The computer-implemented method of claim 1, wherein controlling, by the computing device, the future operation of the computing device comprises determining, by the computing device, whether to store the future image data.

3. The computer-implemented method of claim 1, wherein controlling, by the computing device, the future operation of the computing device comprises determining, by the computing device, whether to automatically upload the future image data to cloud storage.

4. The computer-implemented method of claim 1, wherein identifying, by the computing device, at least the first object comprises at least one of: identifying, by the computing device, a person using face detection, identifying, by the computing device, a gesture performed by a person in the image, or detecting, by the computing device, an action performed by a person in the image.

5. The computer-implemented method of claim 1, further comprising generating, by the computing device, the image data and the audio data.

6. The computer-implemented method of claim 1, wherein:
    the human speech utterance further describes the behavior of the computing device in response to future instances of identification of the first object; and
    the method further comprises determining, by the computing device, the requested behavior based at least in part on the audio data.

7. The computer-implemented method of claim 6, wherein:
    the human speech utterance requests the computing device not capture imagery in response to future instances of identification of the first object in the future image data; and
    defining, by the computing device, the new rule comprises defining, by the computing device, the new rule that specifies that the computing device does not capture imagery in response to future instances of identification of the first object in the future image data.

8. The computer-implemented method of claim 1, wherein:
    the human speech utterance self-references a speaker of the human speech utterance; and
    identifying, by the computing device based at least in part on the audio data and based at least in part on the image data, at least the first object that is referred to by the human speech utterance comprises identifying, by the computing device based at least in part on the image data, the speaker of the human speech utterance.

9. The computer-implemented method of claim 1, wherein the computing device is a camera.

10. The computer-implemented method of claim 1, further comprising obtaining, by the computing device, a transcription of the audio data using automated speech recognition.

11. The computer-implemented method of claim 10, wherein identifying, by the computing device based at least in part on the audio data and based at least in part on the image data, at least the first object comprises identifying, by the computing device based at least in part on the transcription and based at least in part on the image data, at least the first object.

12. A system comprising:
    one or more computers and one or more storage devices storing instructions that are operable, when executed by the one or more computers, to cause the one or more computers to perform operations comprising:
        obtaining, by the one or more computers, (i) image data that describes a first scene that includes one or more objects and (ii) audio data that describes a human speech utterance, wherein the human speech utterance refers to at least a first object of the one or more objects included in the first scene;
        identifying, based at least in part on the audio data and based at least in part on the image data, at least the first object that is included in the first scene and that is referred to by the human speech utterance;
        defining a new rule that specifies a behavior of at least one of the one or more computers in response to future instances of identification of the first object in future image data that is different than the current image data; and
        controlling a future operation of the at least one of the one or more computers to comply with the new rule.

13. The system of claim 12, wherein controlling a future operation of the at least one of the one or more computers comprises determining whether to store the future image data.

14. The system of claim 12, wherein controlling a future operation of the at least one of the one or more computers comprises determining whether to automatically upload future generated image data to cloud storage.

15. The system of claim 12, wherein identifying at least the first object comprises at least one of: identifying a person using face detection, identifying a gesture performed by a person in the first scene, or detecting an action performed by a person in the first scene.

16. The system of claim 12, wherein the operations further comprise generating, by the one or more computers, the image data and the audio data.

17. The system of claim 12, wherein the one or more computers comprise a camera.

18. The system of claim 12, wherein the operations further comprise obtaining a transcription of the audio data using automated speech recognition.

19. The system of claim 18, wherein identifying at least the first object comprises identifying at least the first object based at least in part on the transcription and based at least in part on the image data.

20. A non-transitory, computer-readable medium storing software comprising instructions executable by one or more computers which, upon such execution, cause the one or more computers to perform operations comprising:
- obtaining (i) image data that describes a first scene that includes one or more objects and (ii) audio data that describes a human speech utterance, wherein the human speech utterance refers to at least a first object of the one or more objects included in the first scene;
- identifying the one or more objects in the first scene based on the image data;
- identifying, based at least in part on the audio and based at least in part on the image data, at least the first object that is referred to by the human speech utterance;
- defining a new rule that specifies an image capture behavior of the one or more computers in response to future instances of identification of the first object in future image data that is different than the current image data; and
- controlling a future image capture operation of the one or more computers to comply with the new rule.

* * * * *